(12) United States Patent
Xia et al.

(10) Patent No.: US 11,943,285 B2
(45) Date of Patent: Mar. 26, 2024

(54) METERING COMPUTING RESOURCES IN CLOUD COMPUTING ENVIRONMENTS

(71) Applicant: INTERNATIONAL BUSINESS MACHINES CORPORATION, Armonk, NY (US)

(72) Inventors: Li Xia, Beijing (CN); Lan Luo, Beijing (CN); Jian Dong Yin, Beijing (CN); Jian Zhang, Beijing (CN); Li Long Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 16/361,815

(22) Filed: Mar. 22, 2019

(65) Prior Publication Data
US 2020/0304566 A1 Sep. 24, 2020

(51) Int. Cl.
*H04L 67/1012* (2022.01)
*G06F 9/50* (2006.01)
*H04L 67/1014* (2022.01)

(52) U.S. Cl.
CPC ........ *H04L 67/1012* (2013.01); *G06F 9/5027* (2013.01); *H04L 67/1014* (2013.01)

(58) Field of Classification Search
CPC ............. H04L 67/1012; H04L 67/1014; G06F 9/5027; G06F 2209/508; G06F 9/50
See application file for complete search history.

(56) References Cited

U.S. PATENT DOCUMENTS

| 9,130,943 | B1* | 9/2015 | Giardina ................. H04L 67/16 |
| 9,292,060 | B1* | 3/2016 | Marr ......................... G06F 1/30 |
| 9,310,864 | B1* | 4/2016 | Klein ..................... G06F 1/3206 |
| 9,619,827 | B1* | 4/2017 | Joneja ................ G06Q 30/0284 |
| 9,703,609 | B2  | 7/2017 | Ferris |
| 9,930,138 | B2  | 3/2018 | Ferris |

(Continued)

FOREIGN PATENT DOCUMENTS

CN 101719930 6/2010

OTHER PUBLICATIONS

Li et al., "CCMarketplace: A Marketplace Model for a Hybrid Cloud", CASCON '10 Proceedings of the 2010 Conference of the Center for Advanced Studies on Collaborative Research, pp. 174-183, https://dl.acm.org/citation.cfm?id=1923966, 2010, 10 pages.

(Continued)

*Primary Examiner* — William G Trost, IV
(74) *Attorney, Agent, or Firm* — Maeve Carpenter; Andrew D. Wright; Calderon Safran & Cole, P.C.

(57) ABSTRACT

Methods and systems for metering computing resources in cloud computing environments are disclosed. A method includes: executing, by a computing device, computing tasks on computing resources; determining, by the computing device, an amount of time and an amount of power used in the executing the computing tasks on the computing resources; determining, by the computing device, a number of standard units consumed by the computing tasks based on the determined amount of time and the determined amount of power; and metering, by the computing device, the computing resources based on the determined number of standard units consumed by the computing tasks.

20 Claims, 10 Drawing Sheets

(56) References Cited

U.S. PATENT DOCUMENTS

| | | | |
|---|---|---|---|
| 10,025,627 B2 | 7/2018 | Ferris | |
| 10,129,172 B1* | 11/2018 | Stafford | G06F 9/4881 |
| 11,496,415 B2* | 11/2022 | Jackson | G06F 9/5027 |
| 2008/0080396 A1* | 4/2008 | Meijer | H04L 12/66 370/254 |
| 2008/0244601 A1* | 10/2008 | Zeis | G06F 11/1458 714/E11.197 |
| 2009/0049443 A1* | 2/2009 | Powers | H04L 67/10 718/100 |
| 2009/0182605 A1* | 7/2009 | Lappas | G06Q 10/06 709/206 |
| 2010/0131948 A1 | 5/2010 | Ferris | |
| 2010/0131949 A1* | 5/2010 | Ferris | G06F 9/5027 718/1 |
| 2010/0217864 A1 | 8/2010 | Ferris | |
| 2010/0306379 A1 | 12/2010 | Ferris | |
| 2011/0138034 A1* | 6/2011 | Brookbanks | H04L 67/1097 709/224 |
| 2012/0053925 A1* | 3/2012 | Geffin | H05K 7/1498 703/21 |
| 2012/0120798 A1* | 5/2012 | Jacquet | H04L 47/12 370/230 |
| 2012/0173709 A1* | 7/2012 | Li | G06F 9/5011 709/224 |
| 2012/0290348 A1* | 11/2012 | Hackett | G06Q 10/101 709/226 |
| 2012/0296585 A1* | 11/2012 | Chen | G06F 1/28 702/61 |
| 2012/0331113 A1* | 12/2012 | Jain | H04L 67/1008 709/220 |
| 2013/0138812 A1* | 5/2013 | Assuncao | G06F 9/50 709/226 |
| 2013/0283266 A1* | 10/2013 | Baset | G06F 9/4856 718/1 |
| 2014/0229610 A1* | 8/2014 | Shen | H04L 47/823 709/224 |
| 2014/0282586 A1* | 9/2014 | Shear | H04L 47/70 718/104 |
| 2017/0052873 A1* | 2/2017 | Barsness | G06F 16/9024 |
| 2017/0177417 A1 | 6/2017 | Herbert et al. | |
| 2017/0230266 A1* | 8/2017 | Smola | H04L 43/0876 |
| 2018/0004553 A1* | 1/2018 | Wagner | G06F 9/5077 |
| 2018/0062928 A1* | 3/2018 | Beveridge | H04L 67/1097 |

OTHER PUBLICATIONS

Kash et al., "Pricing the Cloud", IEEE Internet Computing (vol. 20, Issue: 1, Jan.-Feb. 2016), https://ieeexplore.ieee.org/abstract/document/7373504/, 2016, 8 pages.

Mell et al., "The NIST Definition of Cloud Computing", NIST, Special Publication 800-145, Sep. 2011, 7 pages.

* cited by examiner

METERING COMPUTING RESOURCES IN CLOUD COMPUTING ENVIRONMENTS

BACKGROUND

The present invention generally relates to computing devices and, more particularly, to methods and systems for metering computing resources in cloud computing environments.

A cloud computing environment provided by a cloud computing provider may include computing resources such as storage, computation/processing, bandwidth, and cloud applications, among others. A cloud computing user may provide a specification to reserve and use cloud computing resources on the cloud computing environment to perform computing tasks such as running a server, a virtual machine, a software application, a database, and storage, among others. When the cloud computing user requires a change to the specification (e.g., to change the reserved resources), a service request may be made. The cloud computing provider may use a complex metering system to track usage of the cloud computing resources by the cloud computing user. The cloud computing provider may then use a complex billing system to bill the cloud computing user for the resource usage tracked by the metering system.

SUMMARY

In a first aspect of the invention, there is a method that includes: executing, by a computing device, computing tasks on computing resources; determining, by the computing device, an amount of time and an amount of power used in the executing the computing tasks on the computing resources; determining, by the computing device, a number of standard units consumed by the computing tasks based on the determined amount of time and the determined amount of power; and metering, by the computing device, the computing resources based on the determined number of standard units consumed by the computing tasks.

In another aspect of the invention, there is a computer program product that includes a computer readable storage medium having program instructions embodied therewith. The program instructions are executable by a computing device to cause the computing device to: execute a first set of computing tasks corresponding to a first user on a first set of computing resources; execute a second set of computing tasks corresponding to a second user of a second set of computing resources; receive a request to exchange computing resources corresponding to an equal number of standard units between the first set of computing resources used to execute the first set of computing tasks corresponding to the first user and the second set of computing resources used to execute the second set of computing tasks corresponding to the second user; and reallocate the computing resources between the first set of computing resources and the second set of computing resources based on the request, wherein the standard units are determined based on an amount of time and an amount of power consumed.

In another aspect of the invention, there is a system that includes: a hardware processor, a computer readable memory, and a computer readable storage medium associated with a computing device; program instructions to execute computing tasks on computing resources; program instructions to determine an amount of time and an amount of power used in the executing the computing tasks on the computing resources; program instructions to determine a number of standard units consumed by the computing tasks based on the determined amount of time and the determined amount of power; and program instructions to meter the computing resources based on the determined number of standard units consumed by the computing tasks, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
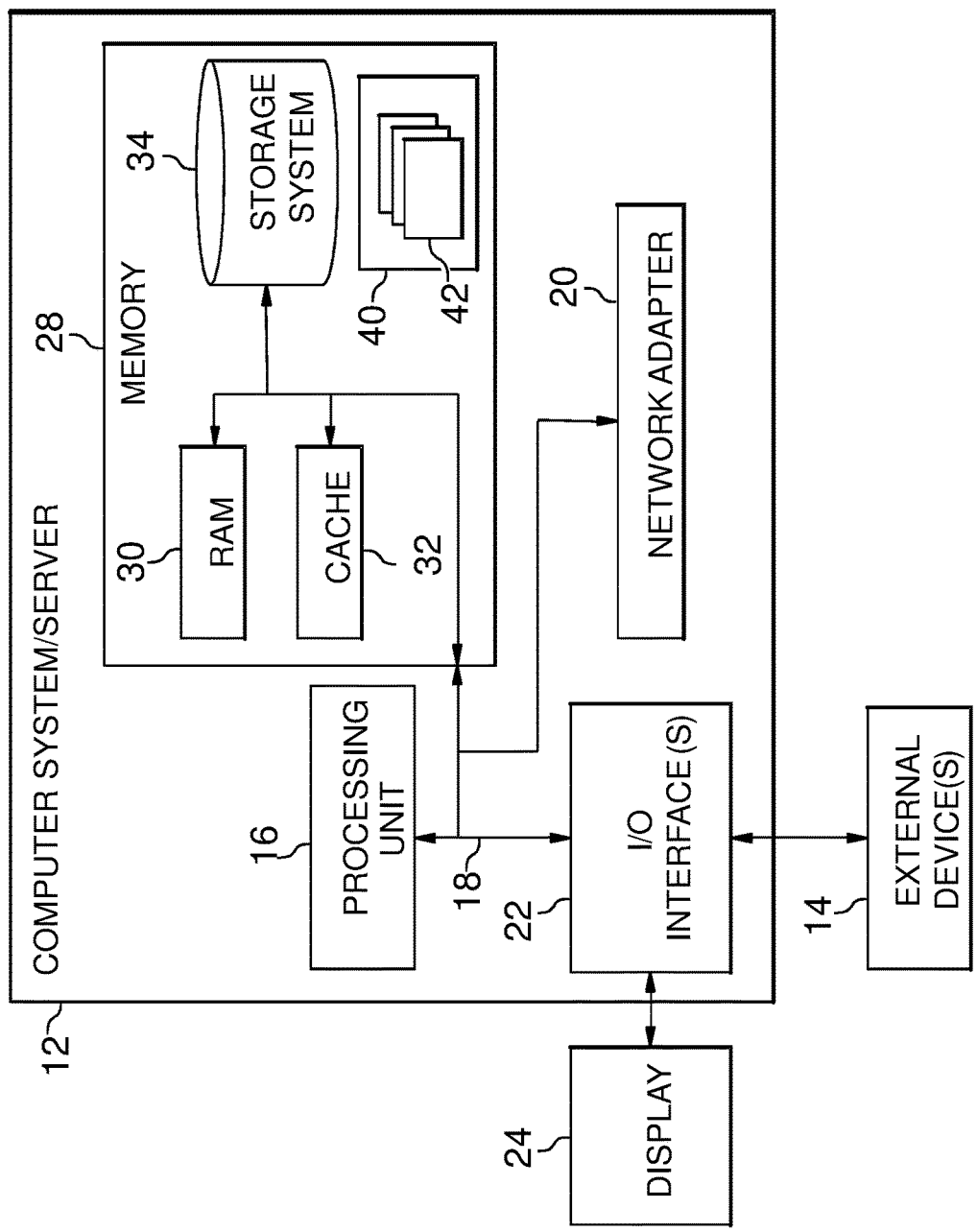
FIG. 1 depicts a cloud computing node according to an embodiment of the present invention.

The present invention generally relates to computing devices and, more particularly, to methods and systems for metering computing resources in cloud computing environments. In embodiments, cloud computing resources are decoupled and monetized for exchange or trade, and a precise metering system is provided that tracks and quantifies use of the cloud computing resources using standard units. In embodiments, standard units are a common unit of measure (e.g., joules) used by a plurality of different cloud computing providers to quantify usage of computing resources.

As described herein, aspects of the invention include a method and system for transforming cloud computing resources to a general equivalent for precise metering and flexible resource exchange. Aspects of the invention also include a method and system for providing precise metering and billing without enforcing virtual machine models. Aspects of the invention also include a method and system for optimizing resource exchange and trading in decentralized cloud computing. Aspects of the invention also include a method and system for providing a high level of abstraction of cloud resources and decoupling the cloud resources for flexible resource allocation and reservation.

Different cloud computing providers conventionally use different metering systems and rules and different billing methods, which makes it difficult for cloud computing users to exchange or trade cloud computing resources that are hosted by different cloud computing providers. This problem may be particularly acute in the case of edge computing.

Additionally, because of the different metering systems and rules used by different cloud computing providers, it may be difficult for cloud computing users to understand the different metering rules when they want to use cloud computing resources from different cloud computing providers. Furthermore, when cloud computing users have cloud computing resources that are released from a workload for a short period of time, they may keep the cloud computing resources unused, which is an inefficient use of the cloud computing resources and money. Additionally, conventional metering and billing systems used by cloud computing providers may be imprecise. Accordingly, in certain cases, these systems may fail to capture certain cloud computing resource usage. In other cases, cloud computing users may be overbilled for cloud computing resource usage.

Embodiments address the above-mentioned problems associated with conventional systems used by cloud computing providers for metering and billing for usage of cloud computing resources. Accordingly, embodiments improve the functioning of a computer by providing methods and systems for more efficient metering and billing for usage of cloud computing resources. In particular, embodiments improve software by providing a method and system for transforming cloud computing resources to a general equivalent for precise metering and flexible resource exchange (e.g., exchanging unused cloud computing resources). Furthermore, embodiments improve software by providing a method and system for precise metering and billing without enforcing virtual machine models. Embodiments also improve software by providing a method and system for optimizing resource exchange and trading in decentralized cloud computing. Embodiments also improve software by providing a method and system for providing a high level of abstraction of cloud resources and decoupling the cloud resources for flexible resource allocation and reservation. Additionally, implementations of the invention use techniques that are, by definition, rooted in computer technology (e.g., cloud computing, edge computing, computing/processing resources, bandwidth resources, and cloud applications).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
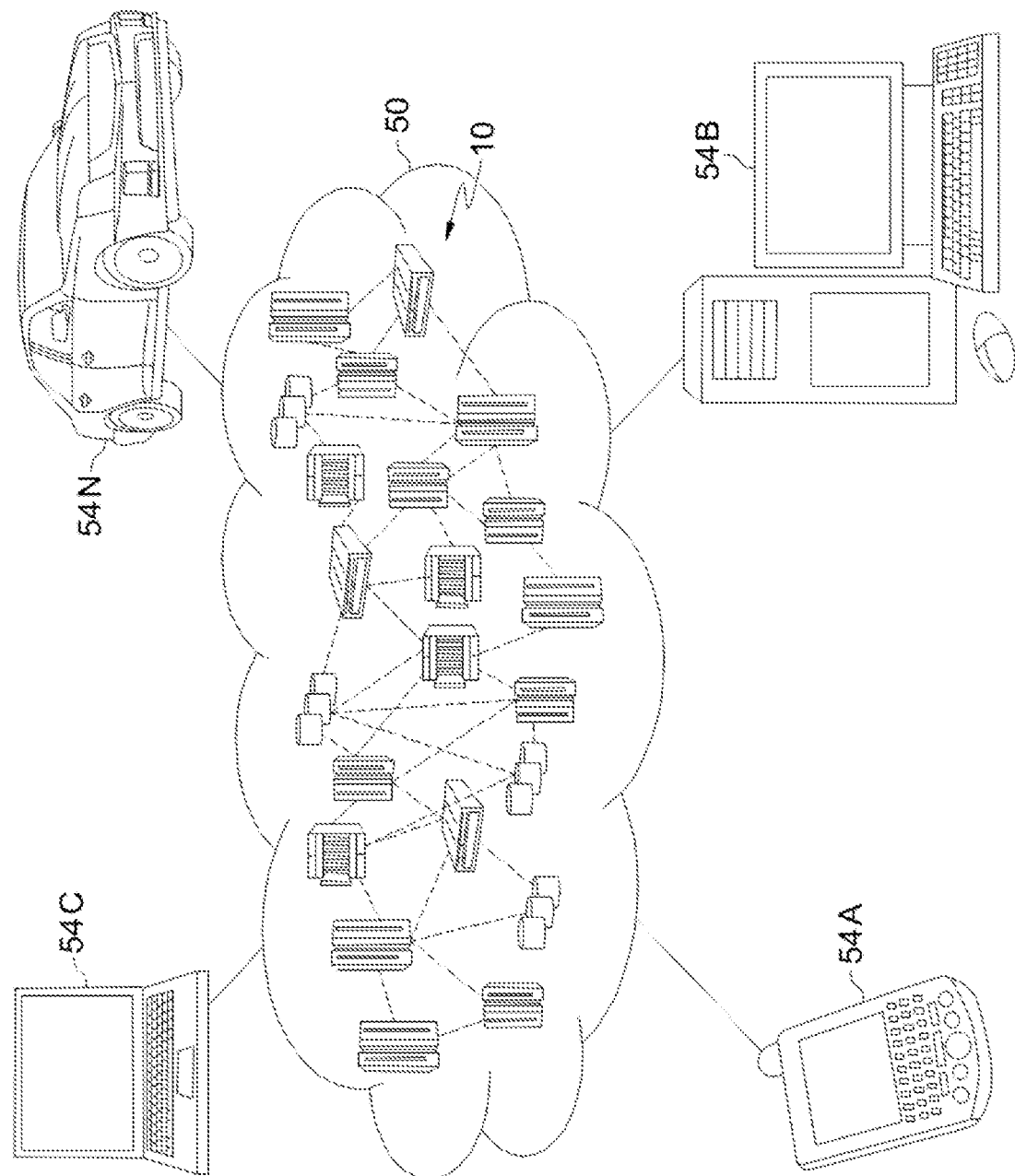
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
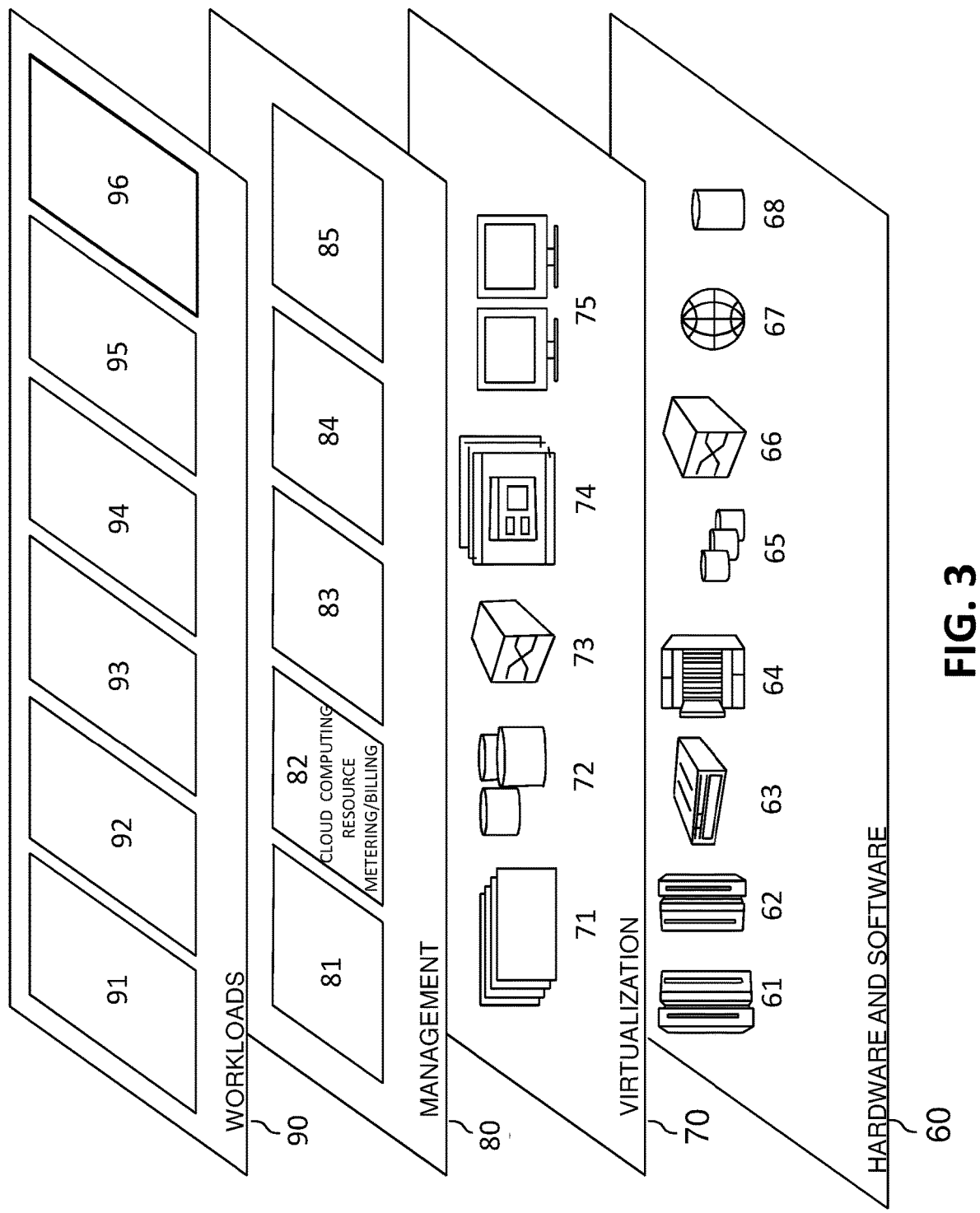
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Cloud computing resource metering/billing 82 provides metering as cloud computing resources are utilized within the cloud computing environment, and billing or invoicing for consumption of these resources. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Referring back to FIG. 1, the program/utility 40 may include one or more program modules 42 that generally carry out the functions and/or methodologies of embodiments of the invention as described herein (e.g., such as the functionality provided by cloud computing resource metering/billing 82). Specifically, the program modules 42 may transform cloud computing resources to a general equivalent for precise metering and flexible resource exchange. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a cloud computing resource metering and billing program module 410 as shown in FIG. 4.

Figure 4:
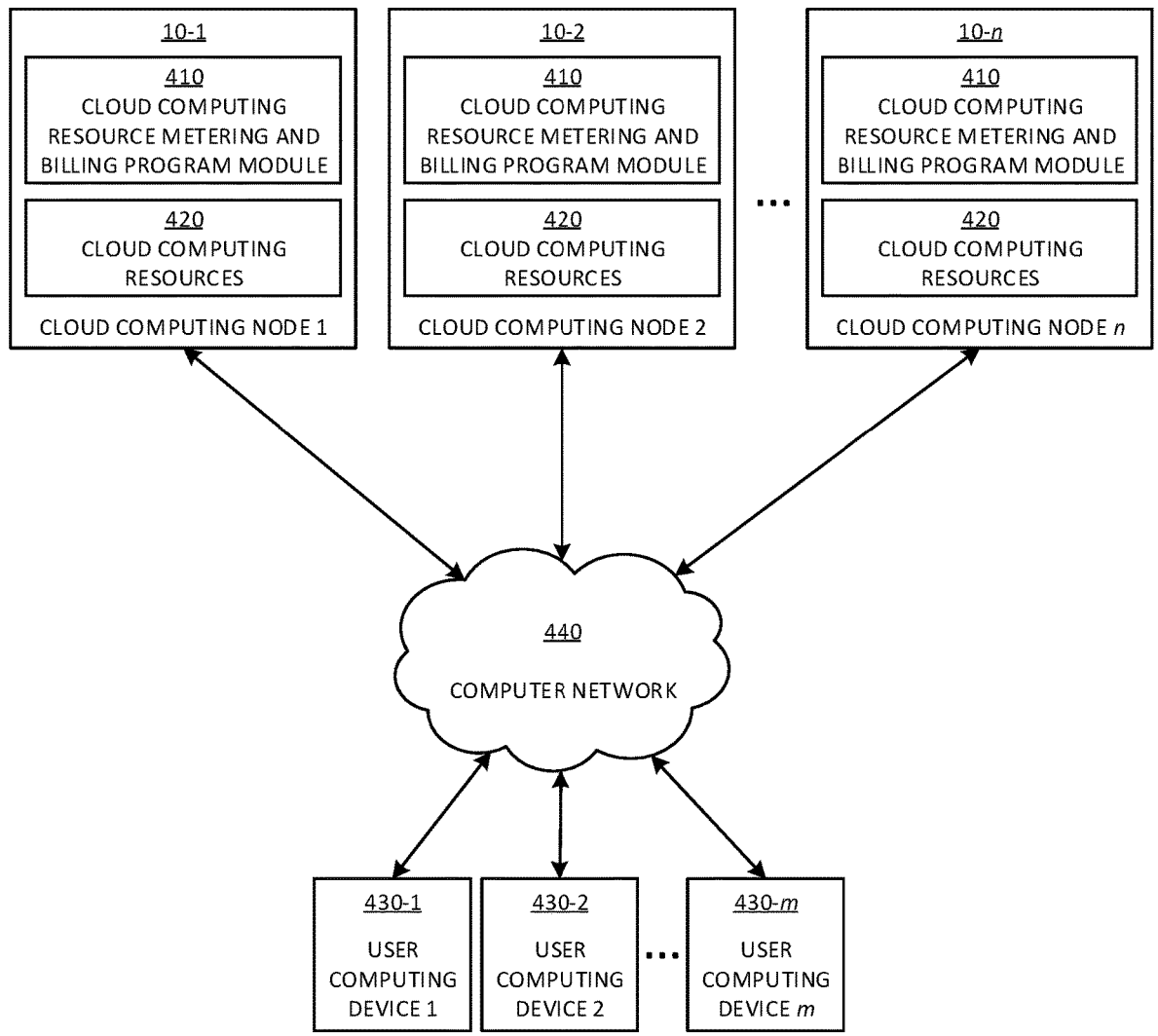
FIG. 4 depicts an illustrative environment in accordance with aspects of the invention.

FIG. 4 depicts an illustrative environment 400 in accordance with aspects of the invention. As shown, the environment 400 comprises a plurality of cloud computing nodes 10-1, 10-2, . . . , 10-n and a plurality of user computing devices 430-1, 430-2, . . . , 430-m which are in communication via a computer network 440. In embodiments, the computer network 440 is any suitable network including any combination of a LAN, WAN, or the Internet. In embodiments, the plurality of cloud computing nodes 10-1, 10-2, . . . , 10-n and the plurality of user computing devices 430-1, 430-2, . . . , 430-m are physically collocated, or, more typically, are situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, each of the cloud computing nodes 10-1, 10-2, . . . , 10-n may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. In embodiments, each of the cloud computing nodes 10-1, 10-2, . . . , 10-n includes the cloud computing resource metering and billing program module 410 and cloud computing resources 420, which may include storage, computing/processing, bandwidth, and cloud applications, among others.

Still referring to FIG. 4, in embodiments, each of the user computing devices 430-1, 430-2, . . . , 430-m is a computer device comprising one or more elements of the computer system/server 12 (as shown in FIG. 1). In particular, each of the user computing devices 430-1, 430-2, . . . , 430-m is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. In other embodiments, each of the user computing devices 430-1, 430-2, . . . , 430-m is a desktop computer, a laptop computer, a mobile device such as a cellular phone, tablet, personal digital assistant (PDA), an edge computing device, or other computing device.

Figure 5:
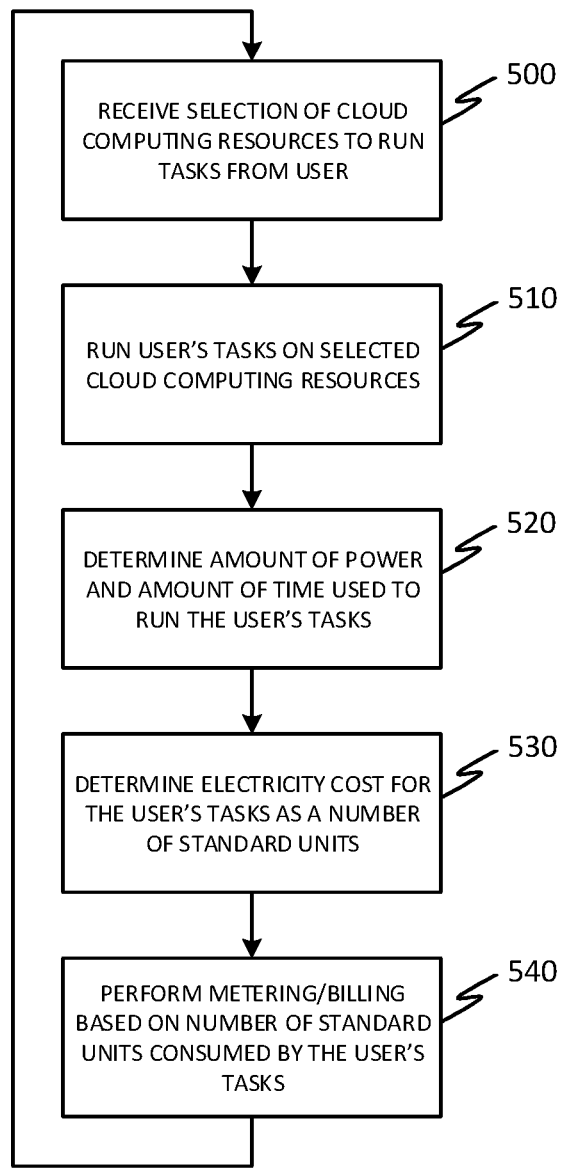
FIGS. 5 and 6 depict flowcharts of exemplary methods performed in accordance with aspects of the invention.

FIG. 5 depicts a flowchart of an exemplary method performed by the cloud computing resource metering and billing program module 410 of the cloud computing nodes 10-1, 10-2, . . . , 10-n in accordance with aspects of the invention. The steps of the method are performed in the environment of FIG. 4 and are described with reference to the elements shown in FIG. 4.

At step 500, each of the cloud computing nodes 10-1, 10-2, . . . , 10-n receives a selection of cloud computing resources to run tasks from a user. In embodiments, the cloud computing resource metering and billing program module 410 receives a selection of particular cloud computing resources from the cloud computing resources 420 on the cloud computing node 10-1, 10-2, . . . , 10-n to be used to run specified tasks for the user.

Still referring to step 500, this selection of particular cloud computing resources of the cloud computing resources 420 to be used to run the user's tasks that is received at step 500 may be received by the cloud computing resource metering and billing program module 410 in the form of a specification or a service request and may be received directly from one of the user computing devices 430-1, 430-2, . . . , 430-m or may be received from the management layer 80 of the cloud computing environment 50 of FIG. 2 (e.g., in response to instructions received at the management layer 80 from one of the user computing devices 430-1, 430-2, . . . , 430-m). For example, the selection of particular cloud computing resources of the cloud computing resources 420 to be used to run the user's tasks may be received by the cloud computing resource metering and billing program module 410 from the resource provisioning 81, the user portal 83, the service level management 84, and/or the SLA planning and fulfillment 85 of the management layer 80 of the cloud computing environment 50 of FIG. 2.

Still referring to FIG. 5, at step 510, each of the cloud computing nodes 10-1, 10-2, . . . , 10-n runs the user's tasks on the selected cloud computing resources. In embodiments, the cloud computing resource metering and billing program module 410 communicates with the management layer 80 of the cloud computing environment 50 of FIG. 2 to initiate the running of the user's tasks on the selected cloud computing resources of the cloud computing resources 420 of the cloud computing node 10-1, 10-2, . . . , 10-n in accordance with the selection received at step 500. For example, in embodiments, the cloud computing resource metering and billing program module 410 communicates with the resource provisioning 81, the service level management 84, and/or the SLA planning and fulfillment 85 to initiate the running of the user's tasks on the selected cloud computing resources.

Still referring to FIG. 5, at step 520, each of the cloud computing nodes 10-1, 10-2, . . . , 10-n determines an amount of power and an amount of time used to run the user's tasks. In embodiments, the cloud computing resource metering and billing program module 410 determines the amount of power (e.g., a number of watts) utilized by the selected cloud computing resources of the cloud computing resources 420 on the cloud computing node 10-1, 10-2, . . . , 10-n on which the user's tasks are running. Additionally, the cloud computing resource metering and billing program module 410 determines the amount of time (e.g., a number of seconds) spent by the selected cloud computing resources of the cloud computing resources 420 on the cloud computing node 10-1, 10-2, . . . , 10-n running the user's tasks.

Still referring to step 520, in other embodiments, the cloud computing resource metering and billing program module 410 uses a software tool or utility such as PowerTOP to estimate the amount of power and the amount of time used to run the user's tasks. For example, a software tool or utility may be used to estimate power usage (e.g., number of watts) of processes running on the cloud computing node 10-1, 10-2, . . . , 10-n that are executing the user's tasks as well as an amount of time (e.g., number of seconds) used by the processes to execute the user's tasks.

Still referring to FIG. 5, at step 530, each of the cloud computing nodes 10-1, 10-2, . . . , 10-n determines an electricity cost for the user's tasks as a number of standard units (e.g., joules). In embodiments, the cloud computing resource metering and billing program module 410 determines the electricity cost as the number of joules consumed while executing the user's tasks on the selected cloud computing resources of the cloud computing resources 420 of the cloud computing node 10-1, 10-2, . . . , 10-n. To determine the number of joules consumed, the cloud computing resource metering and billing program module 410 uses the amount of power utilized by the selected cloud computing resources on which the user's tasks are running and the amount of time spent by the selected cloud computing resources running the user's tasks, as determined at step 520. In particular, in embodiments, the cloud computing resource metering and billing program module 410 multiplies the determined number of watts (from step 520) by the determined number of seconds (from step 520) in order to determine the number of joules that is the electricity cost.

Still referring to FIG. 5, at step 540, each of the cloud computing nodes 10-1, 10-2, . . . , 10-n performs metering/billing based on the number of standard units consumed by the user's tasks. In embodiments, the cloud computing resource metering and billing program module 410 provides information (e.g., a billing report) to a user (e.g., customer) or administrator about the number of standard units consumed by the user's tasks running on the selected cloud computing resources of the cloud computing resources 420 of the cloud computing node 10-1, 10-2, . . . , 10-n as well as a cost or fee for the use of the selected cloud computing resources determined based on the number of standard units.

Still referring to step 540, in embodiments, the cloud computing resource metering and billing program module 410 may provide the information about the number of standard units and the cost or fee for the use of the selected cloud computing resources to the user or administrator directly, for example, via one of the user computing devices 430-1, 430-2, . . . , 430-m, or indirectly, for example, via the management layer 80 of the cloud computing environment 50 of FIG. 2. In embodiments, additional billing functions may be performed and payments collected on the basis of the determined number of standard units consumed by the user's tasks running on the selected cloud computing resources of the cloud computing resources 420 of the cloud computing node 10-1, 10-2, . . . , 10-n.

In a pay-per-use embodiment, in performing the metering/billing function at step 540, the cloud computing resource metering and billing program module 410 may determine an amount to be charged to the user based on the determined number of standard units consumed by the user's tasks running on the selected cloud computing resources of the cloud computing resources 420 of the cloud computing node 10-1, 10-2, . . . , 10-n. In a pay-in advance embodiment, the user may create and maintain a prepaid account by purchasing a predetermined number of standard units in advance, and the cloud computing resource metering and billing program module 410 may debit the user's prepaid account on the basis of the determined number of standard units consumed by the user's tasks running on the selected cloud computing resources of the cloud computing resources 420 of the cloud computing node 10-1, 10-2, . . . , 10-n.

The flow then returns to step 500, and each of the cloud computing nodes 10-1, 10-2, . . . , 10-n again receives a selection of cloud computing resources to run tasks from a user.

Figure 6:
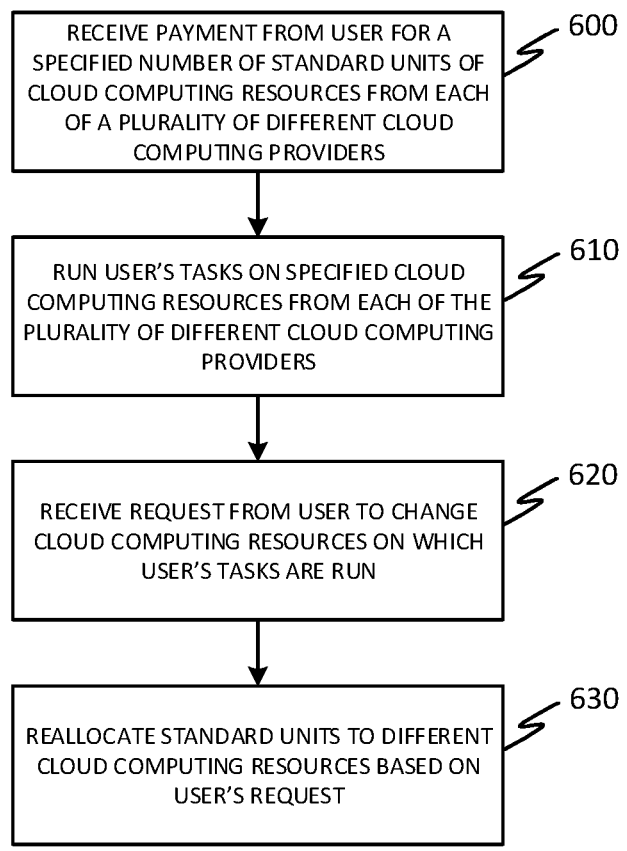

FIG. 6 depicts a flowchart of an exemplary method performed by the cloud computing resource metering and billing program module 410 of the cloud computing nodes 10-1, 10-2, . . . , 10-n in accordance with aspects of the invention. The steps of the method are performed in the environment of FIG. 4 and are described with reference to the elements shown in FIG. 4.

At step 600, the cloud computing nodes 10-1, 10-2, . . . , 10-n receive payment from a user for a specified number of standard units of cloud computing resources from each of a plurality of different cloud computing providers. In embodiments, the cloud computing resource metering and billing program module 410 running on the cloud computing nodes 10-1, 10-2, . . . , 10-n receives information about at least one payment from the user for a specified number of standard units of cloud computing resources 420 from each of the plurality of different cloud computing providers. In embodiments, the cloud computing resource metering and billing program module 410 determines the number of standard units in accordance with the method of FIG. 5, as described herein.

In an example, the cloud computing node 10-1 is associated with a first cloud computing provider, the cloud computing node 10-2 is associated with a second cloud computing provider, and the cloud computing node 10-n is associated with a nth cloud computing provider. The payment received at step 600 includes payment for a first quantity of standard units of cloud computing resources 420 on the cloud computing node 10-1 associated with the first cloud computing provider, payment for a second quantity of standard units of cloud computing resources 420 on the cloud computing node 10-2 associated with the second cloud computing provider, and payment for an nth quantity of standard units of cloud computing resources 420 on the cloud computing node 10-n associated with the nth cloud computing provider.

At step 610, the cloud computing nodes 10-1, 10-2, . . . , 10-n run the user's tasks on specified cloud computing resources from each of the plurality of different cloud computing providers. In embodiments, the cloud computing resource metering and billing program module 410 receives from the user information about specified cloud computing resources of the cloud computing resources 420 on the cloud computing nodes 10-1, 10-2, . . . , 10-n of the first to nth cloud computing providers, respectively, on which to run the user's tasks. This information may be received by the cloud computing resource metering and billing program module 410 in the form of a specification or a service request and may be received directly from one of the user computing devices 430-1, 430-2, . . . , 430-m or may be received from the management layer 80 of the cloud computing environment 50 of FIG. 2 (e.g., in response to instructions received at the management layer 80 from one of the user computing devices 430-1, 430-2, . . . , 430-m). For example, the selection of particular cloud computing resources of the cloud computing resources 420 to be used to run the user's tasks may be received by the cloud computing resource metering and billing program module 410 from the resource provisioning 81, the user portal 83, the service level management 84, and/or the SLA planning and fulfillment 85 of the management layer 80 of the cloud computing environment 50 of FIG. 2.

Still referring to step 610, the cloud computing resource metering and billing program module 410 communicates with the management layer 80 of the cloud computing environment 50 of FIG. 2 to initiate the running of the user's tasks on the selected cloud computing resources of the cloud computing resources 420 on the cloud computing nodes 10-1, 10-2, . . . , 10-n of the first to nth cloud computing providers. For example, in embodiments, the cloud computing resource metering and billing program module 410 communicates with the resource provisioning 81, the service level management 84, and/or the SLA planning and fulfillment 85 to initiate the running of the user's tasks on the selected cloud computing resources.

Still referring to FIG. 6, at step 620, the cloud computing nodes 10-1, 10-2, . . . , 10-n receive a request from the user to change the cloud computing resources on which the user's tasks are run. In embodiments, the cloud computing resource metering and billing program module 410 receives a change request from the user, either directly from one of the user computing devices 430-1, 430-2, . . . , 430-m or via the management layer 80 of the cloud computing environment 50 of FIG. 2 (e.g., in response to instructions received at the management layer 80 from one of the user computing devices 430-1, 430-2, . . . , 430-m). For example, the change request may be received by the cloud computing resource metering and billing program module 410 from the resource provisioning 81, the user portal 83, the service level management 84, and/or the SLA planning and fulfillment 85 of the management layer 80 of the cloud computing environment 50 of FIG. 2. In an example, users may request to change the cloud computing resources on which the user's tasks are run when a required resource is not available or is overloaded on one provider.

Still referring to FIG. 6, at step 630, the cloud computing nodes 10-1, 10-2, . . . , 10-n reallocate the standard units to different cloud computing resources based on the user's request. In particular, the cloud computing resource metering and billing program module 410 communicates with the management layer 80 of the cloud computing environment 50 of FIG. 2 to reallocate the cloud computing resources 420 on the cloud computing nodes 10-1, 10-2, . . . , 10-n of the first to nth cloud computing providers that are used to run the user's tasks based on the change request received at step 620. For example, in embodiments, the cloud computing resource metering and billing program module 410 communicates with the resource provisioning 81, the service level management 84, and/or the SLA planning and fulfillment 85 to reallocate the cloud computing resources 420 based on the change request received at step 620.

Figure 7A:
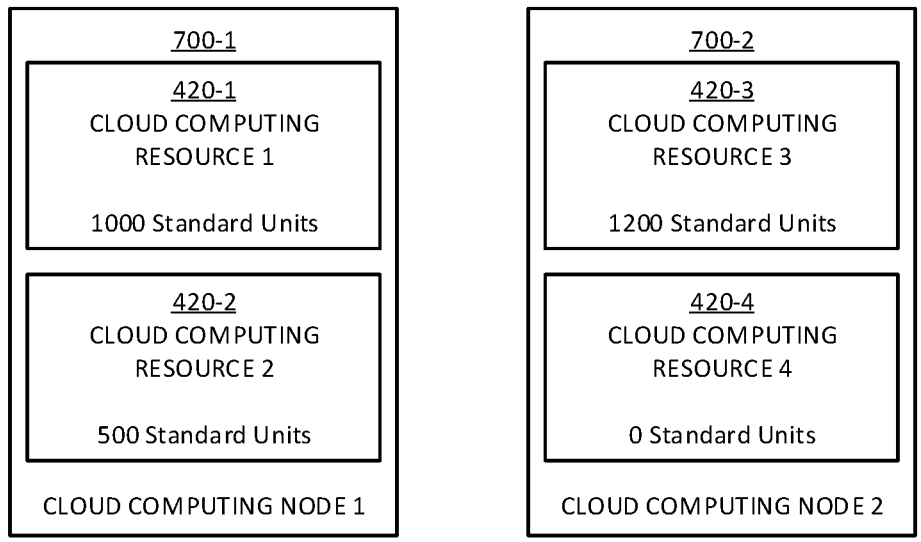
FIGS. 7A and 7B illustrate exemplary allocations of cloud computing resources on cloud computing nodes in accordance with aspects of the invention.
Figure 7B:
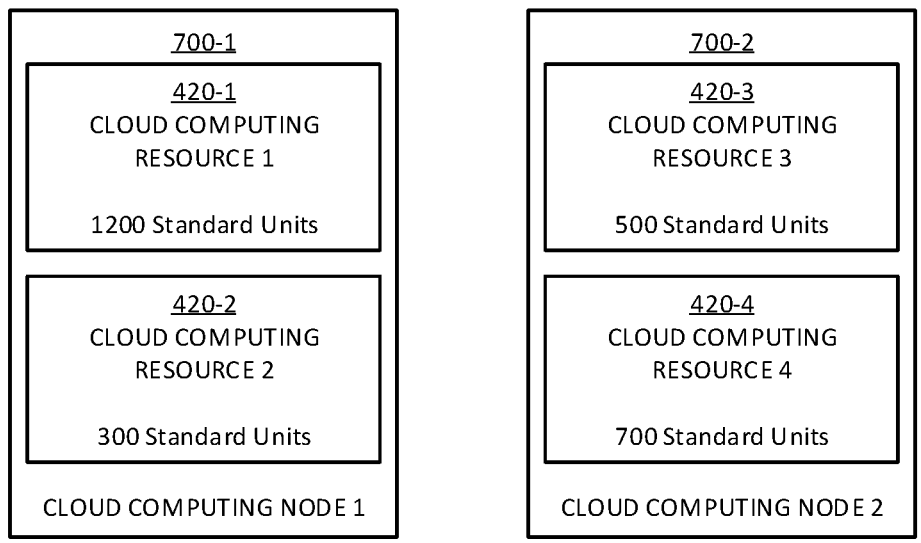

FIGS. 7A and 7B illustrate exemplary allocations of cloud computing resources 420-1 and 420-2 on cloud computing node 700-1 of a first cloud computing provider and cloud computing resources 420-3 and 420-4 on cloud computing node 700-2 of a second cloud computing provider in accordance with the method of FIG. 6.

In the example illustrated in FIG. 7A, in response to the cloud computing resource metering and billing program module 410 receiving payment from a user for 1500 standard units of cloud computing resources on the cloud computing node 700-1 of the first cloud computing provider, the cloud computing resource metering and billing program module 410 causes 1000 standard units to be allocated to running the user's tasks on cloud computing resource 420-1 and 500 standard units to be allocated to running the user's tasks on cloud computing resource 420-2. Additionally, in response to the cloud computing resource metering and billing program module 410 receiving payment from the user for 1200 standard units of cloud computing resources on the cloud computing node 700-2 of the second cloud computing provider, the cloud computing resource metering and billing program module 410 causes 1200 standard units to be allocated to running the user's tasks on cloud computing resource 420-3 and 0 standard units to be allocated to running the user's tasks on cloud computing resource 420-4.

In response to the cloud computing resource metering and billing program module 410 receiving a request from the user to change the cloud computing resources on which the user's tasks are run, as illustrated in FIG. 7B, the cloud computing resource metering and billing program module 410 reallocates the standard units such that 1200 standard units are allocated to running the user's tasks on cloud computing resource 420-1 and 300 standard units are allocated to running the user's tasks on cloud computing resource 420-2. Additionally, in response to receiving the change request from the user, the cloud computing resource metering and billing program module 410, the cloud computing resource metering and billing program module 410 reallocates the standard units such that 500 standard units are allocated to running the user's tasks on cloud computing resource 420-3 and 700 standard units are allocated to running the user's tasks on cloud computing resource 420-4.

Figure 8:
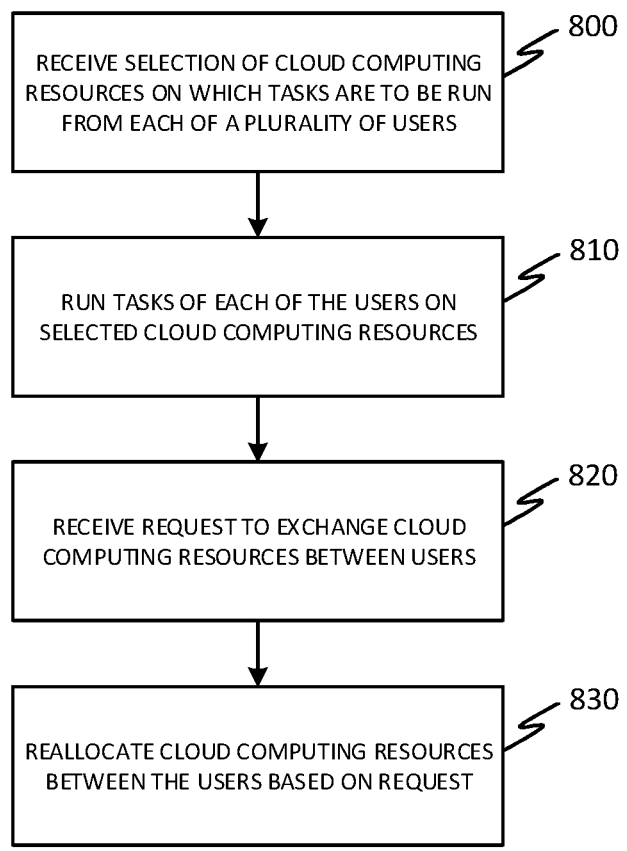
FIG. 8 depicts a flowchart of an exemplary method performed in accordance with aspects of the invention.

FIG. 8 depicts a flowchart of an exemplary method performed by the cloud computing resource metering and billing program module 410 of the cloud computing nodes 10-1, 10-2, . . . , 10-$n$ in accordance with aspects of the invention. The steps of the method are performed in the environment of FIG. 4 and are described with reference to the elements shown in FIG. 4.

At step 800, the cloud computing node 10-1, 10-2, . . . , 10-$n$ receives a selection of cloud computing resources on which tasks are to be run from each of a plurality of users. In embodiments, the cloud computing resource metering and billing program module 410 receives from each of the plurality of users a selection of particular cloud computing resources of the cloud computing resources 420 on the cloud computing node 10-1, 10-2, . . . , 10-$n$ on which to run the user's tasks. This information may be received by the cloud computing resource metering and billing program module 410 in the form of a specification or a service request and may be received directly from one of the user computing devices 430-1, 430-2, . . . , 430-$m$ or may be received from the management layer 80 of the cloud computing environment 50 of FIG. 2 (e.g., in response to instructions received at the management layer 80 from one of the user computing devices 430-1, 430-2, . . . , 430-$m$). For example, the selection of particular cloud computing resources of the cloud computing resources 420 to be used to run the user's tasks may be received by the cloud computing resource metering and billing program module 410 from the resource provisioning 81, the user portal 83, the service level management 84, and/or the SLA planning and fulfillment 85 of the management layer 80 of the cloud computing environment 50 of FIG. 2.

Still referring to FIG. 8, at step 810, the cloud computing node 10-1, 10-2, . . . , 10-$n$ runs the tasks of each of the users on the selected cloud computing resources. In embodiments, the cloud computing resource metering and billing program module 410 communicates with the management layer 80 of the cloud computing environment 50 of FIG. 2 to initiate the running of the tasks of each of the users on the selected cloud computing resources (from step 800) of the cloud computing resources 420 on the cloud computing node 10-1, 10-2, . . . , 10-$n$. For example, in embodiments, the cloud computing resource metering and billing program module 410 communicates with the resource provisioning 81, the service level management 84, and/or the SLA planning and fulfillment 85 to initiate the running of the task of each of the users on the selected cloud computing resources.

Still referring to FIG. 8, at step 820, the cloud computing node 10-1, 10-2, . . . , 10-$n$ receives a request to exchange cloud computing resources between the users. In embodiments, the cloud computing resource metering and billing program module 410 receives a change request from the users, either directly from one of the user computing devices 430-1, 430-2, . . . , 430-$m$ or via the management layer 80 of the cloud computing environment 50 of FIG. 2 (e.g., in response to instructions received at the management layer 80 from one of the user computing devices 430-1, 430-2, . . . , 430-$m$). For example, the change request may be received by the cloud computing resource metering and billing program module 410 from the resource provisioning 81, the user portal 83, the service level management 84, and/or the SLA planning and fulfillment 85 of the management layer 80 of the cloud computing environment 50 of FIG. 2. In embodiments, the change request received at step 820 is a request to exchange or trade an equal number of standard units of cloud computing resources 420 on the cloud computing node 10-1, 10-2, . . . , 10-$n$ between the users. In embodiments, the cloud computing resource metering and billing program module 410 determines the number of standard units in accordance with the method of FIG. 5, as described herein.

Still referring to FIG. 8, at step 830, the cloud computing node 10-1, 10-2, . . . , 10-$n$ reallocates the cloud computing resources 420 between the users based on the request. In embodiments, in response to receiving the request to exchange cloud computing resources at step 820, the cloud computing resource metering and billing program module 410 causes the cloud computing node 10-1, 10-2, . . . , 10-$n$ reallocate the standard units of the cloud computing resources 420 between the users based on the request. In particular, the cloud computing resource metering and billing program module 410 communicates with the management layer 80 of the cloud computing environment 50 of FIG. 2 to reallocate between the users the cloud computing resources 420 on the cloud computing node 10-1, 10-2, . . . , 10-$n$ that are used to run the tasks based on the change request received at step 820. For example, in embodiments, the cloud computing resource metering and billing program module 410 communicates with the resource provisioning 81, the service level management 84, and/or the SLA planning and fulfillment 85 to reallocate the cloud computing resources 420 based on the change request received at step 820.

Figure 9A:
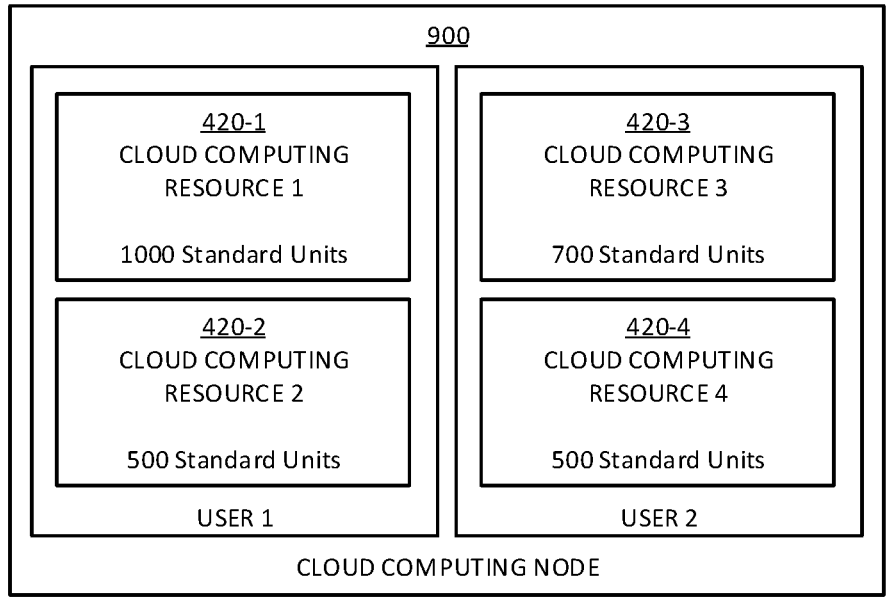
FIGS. 9A and 9B illustrate exemplary allocations of cloud computing resources on cloud computing nodes in accordance with aspects of the invention.
Figure 9B:
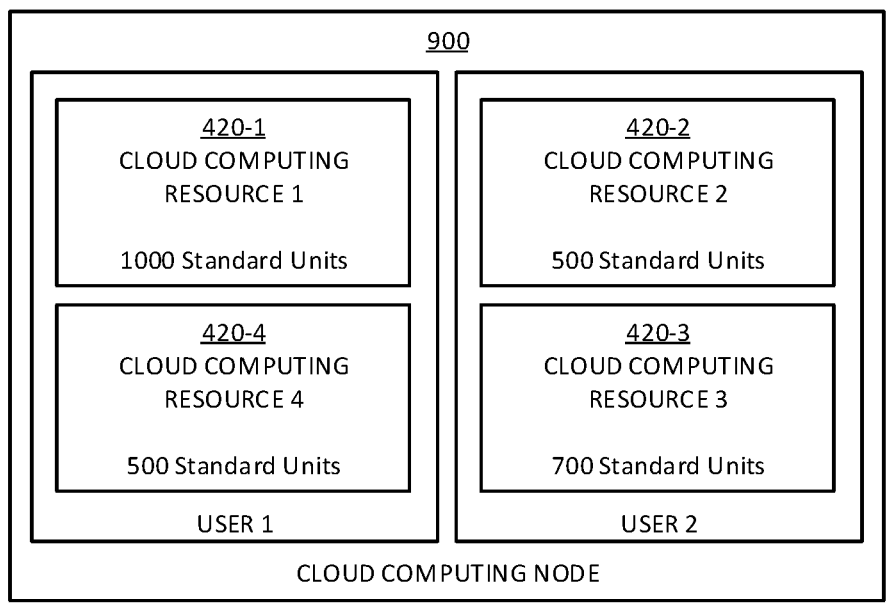

FIGS. 9A and 9B illustrate exemplary allocations of cloud computing resources 420-1, 420-2, 420-3, and 420-4 on cloud computing node 900 in accordance with the method of FIG. 8.

In the example illustrated in FIG. 9A, in response to the cloud computing resource metering and billing program module 410 receiving a selection of cloud computing resources on which tasks are to be run from each of a plurality of users, the cloud computing resource metering and billing program module 410 causes 1000 standard units of cloud computing resource 420-1 and 500 standard units of cloud computing resource 420-2 to be allocated to running the first user's tasks and 700 standard units of cloud computing resource 420-3 and 500 standard units of cloud computing resource 420-4 to be allocated to running the second user's tasks.

In response to the cloud computing resource metering and billing program module 410 receiving a request from the users to exchange the cloud computing resources between the users, as illustrated in FIG. 9B, the cloud computing resource metering and billing program module 410 reallocates the standard units such that 1000 standard units of cloud computing resource 420-1 and 500 standard units of cloud computing resource 420-4 are allocated to running the first user's tasks and 500 standard units of cloud computing resource 420-2 and 700 standard units of cloud computing resource 420-3 are allocated to running the second user's tasks.

Figure 10:
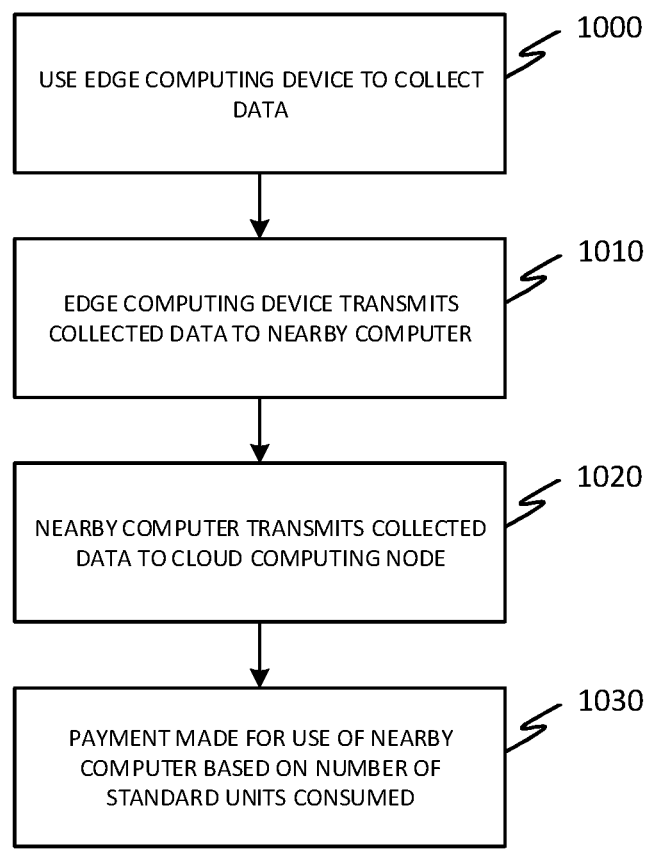
FIG. 10 depicts a flowchart of an exemplary method performed in accordance with aspects of the invention.

FIG. 10 depicts a flowchart of an exemplary method in accordance with aspects of the invention. The steps of the method are performed in the environment of FIG. 4 and are described with reference to the elements shown in FIG. 4.

At step 1000, an edge computing device is used to collect data. In embodiments, the edge computing device is one of the user computing devices 430-1, 430-2, . . . , 430-$m$ (of FIG. 4). In an example, the edge computing device may be a payment terminal or an Internet of things (IoT) device. The edge computing device may collect a large amount of data to be stored and/or may collect the data in a situation in which the cloud computing node 10-1, 10-2, ..., 10-*n* (of FIG. 10) is inaccessible (e.g., due to limitations of the edge computing device).

At step 1010, the edge computing device transmits the collected data to a nearby computer. In embodiments, the nearby computer is another of the user computing devices 430-1, 430-2, ..., 430-*m* (of FIG. 4) that is different from the edge computing device. The edge computing device may transmit the collected data to the nearby computer via the computer network 440 (of FIG. 4) or through another communication mechanism (e.g., Bluetooth, Wi-Fi, etc.).

At step 1020, the nearby computer transmits the collected data to a cloud computing node. In embodiments, the nearby computer transmits the collected data from the edge computing device received at step 1010 to the cloud computing node 10-1, 10-2, ..., 10-*n* via the computer network 440 (of FIG. 4) or through another communication mechanism (e.g., Bluetooth, Wi-Fi, etc.).

At step 1030, payment is made for the use of the nearby computer based on a number of standard units consumed. In embodiments, the cloud computing resource metering and billing program module 410 running on the cloud computing node 10-1, 10-2, ..., 10-*n* determines the number of standard units consumed by the nearby computer in receiving the data from the edge computing device at step 1010 and transmitting the data to the cloud computing node 10-1, 10-2, ..., 10-*n* at step 1020. In particular, the cloud computing resource metering and billing program module 410 determines the number of standard units consumed as described herein with respect to steps 520 and 530 of FIG. 5. The cloud computing resource metering and billing program module 410 then bills an owner of the edge computing device based on the determined number of standard units, as described herein with respect to step 540 of FIG. 5. The owner of the edge computing device then makes payment for the standard units consumed to the owner of the nearby computer.

Accordingly, it is understood from the foregoing description that embodiments of the invention provide a method of monetizing computing resources in which users pay for use of the computing resources based on standard units. Additionally, in embodiments, users may use a number of standard units of any resource that is equivalent to a paid number of standard units of another resource, thereby simplifying the use of cloud computing resources. Additionally, in embodiments, users may change cloud configurations according to a number of standard units for which they have paid or contracted, thereby providing for flexibility in the use of cloud computing resources. Additionally, in embodiments, users may pay for cloud computing resources for edge computing devices as needed, thereby optimizing the user's use of cloud computing resources.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computing device, a selection of particular cloud computing resources of a cloud computing provider used to run computing tasks on computing resources of the computing device, the selection of particular cloud computing resources of the cloud computing provider being received as a service request;
executing, by the computing device, the computing tasks on the selection of the particular cloud computing resources;
metering, by the computing device, an amount of time and an amount of power used while executing the computing tasks on the computing resources of the computing device;
determining, by the computing device, a number of standard energy units consumed by the computing tasks based on the determined amount of time and the determined amount of power;
with the computing device, determining a financial cost for use of the computing resources based on the determined number of standard energy units consumed by the computing tasks;
with the computing device, determining a fee to be charged for using the selected particular cloud computing resources of the computing resources based on the financial cost determined for the consumed number of standard energy units of the computing device;
determining, by the computing device, that the particular cloud computing resources are overloaded on the cloud computing provider;
receiving, by the computing device, a request to change the particular cloud computing resources to be used in the executing of the computing tasks in response to the determining that the particular cloud computing resources are overloaded on the cloud computing provider;
reallocating, by the computing device, the number of standard energy units to different cloud computing resources based on the received request;
receiving, by the computing device, collected data from a first edge computing device;
determining, by the computing device, a number of standard energy units consumed by the first edge computing device in receiving the collected data from a second edge computing device; and billing, by the computing device, an owner of the second edge computing device which is different from the first edge computing device.

2. The method according to claim 1, further comprising determining, by the computing device, a number of seconds used in the executing the computing tasks as the amount of time, wherein the first edge computing device comprises an Internet of things (IoT) device.

3. The method according to claim 2, further comprising determining, by the computing device, a number of watts used in the executing the computing tasks as the amount of power, wherein the first edge computing device receives the collected data from the second edge computing device through Bluetooth.

4. The method according to claim 3, further comprising determining, by the computing device, a number of joules used in the executing the computing tasks as the number of standard energy units by multiplying the determined number of seconds and the determined number of watts.

5. The method according to claim 4, further comprising generating, by the computing device, a billing report the fee to be charged.

6. The method according to claim 5, wherein the billing report includes the number of standard energy units, and the fee for using the selected particular cloud computing resources.

7. The method according to claim 1, further comprising:
receiving payment from a user for a specified number of standard energy units, wherein the selected particular cloud computing resources are a selection of the computing resources to be used in the executing of the computing tasks, and the first edge computing device comprises a payment terminal.

8. A computer program product comprising a computer readable storage medium having program instructions embodied therewith, the program instructions executable by a computing device to cause the computing device to:

receive a selection of a first set of particular computing resources of a cloud computing provider of the computing device used to run a first set of computing tasks on the computing device, the selection of the first set of particular computing resources of the cloud computing provider being received as a service request;

execute the first set of computing tasks corresponding to the first user on the first set of particular computing resources of the computing device;

determine a financial cost for using the first set of particular computing resources based on a number of standard energy units used by the computing device;

receive a selection of a second set of particular computing resources of the computing device used to run a first set of computing tasks on the computing device, the selection of the second set of particular computing resources being received as another service request;

execute the second set of computing tasks corresponding to a second user of the second set of particular computing resources based on a second number of standard energy units;

determine a financial cost for using the second set of particular computing resources based on a number of standard energy units used by the computing device;

receive a request to exchange computing resources corresponding to an equal number of standard energy units between the first set of particular computing resources used to execute the first set of computing tasks corresponding to the first user and the second set of particular computing resources used to execute the second set of computing tasks corresponding to the second user;

reallocate the exchanged computing resources between the first set of particular computing resources and the second set of particular computing resources based on the request;

bill a fee for using the exchanged computing resources based on the determined financial cost for the reallocated number of standard energy units consumed by the computing device;

determine that the particular cloud computing resources are overloaded on the cloud computing provider;

receive a request to change the particular cloud computing resources to be used in the executing of the computing tasks in response to the determining that the particular cloud computing resources are overloaded on the cloud computing provider;

reallocate the number of standard energy units to different cloud computing resources based on the received request;

receive collected data from a first edge computing device;

determine a number of standard energy units consumed by the first edge computing device in receiving the collected data from a second edge computing device; and bill an owner of the second edge computing device which is different from the first edge computing device, wherein the standard energy units are determined based on an amount of time and an amount of power consumed by the exchanged computing resources.

9. The computer program product according to claim 8, the program instructions further being executable by the computing device to cause the computing device to estimate the amount of time based on a time used to execute computing tasks on the exchanged computing resources, wherein the first edge computing device comprises an Internet of things (IoT) device.

10. The computer program product according to claim 9, the program instructions further being executable by the computing device to cause the computing device to determine a number of seconds used in the executing the computing tasks as the amount of time, wherein the first edge computing device receives the collected data from the second edge computing device through Bluetooth.

11. The computer program product according to claim 10, the program instructions further being executable by the computing device to cause the computing device to determine the amount of power based on power used to execute computing tasks on the exchanged computing resources.

12. The computer program product according to claim 11, the program instructions further being executable by the computing device to cause the computing device to determine a number of watts used in the executing the computing tasks as the amount of power.

13. The computer program product according to claim 12, the program instructions further being executable by the computing device to cause the computing device to determine a number of joules used in the executing the computing tasks as the number of standard energy units by multiplying the determined number of seconds and the determined number of watts.

14. The computer program product according to claim 9, the program instructions further being executable by the computing device to cause the computing device to determine a fee for use of the first set of particular computing resources based on a determined number of standard energy units consumed by the first set of computing tasks and determine a fee for use of the second set of particular computing resources based on a determined number of standard energy units consumed by the second set of particular computing resources.

15. The computer program product according to claim 9, the program instructions further being executable by the computing device to cause the computing device to generate a billing report for use of the computing resources; and
   receiving payment from a user for a specified number of standard energy units.

16. The computer program product according to claim 15, wherein the billing report includes the number of standard energy units and a fee corresponding to the number of standard energy units.

17. A system comprising:
   a hardware processor, a computer readable memory, and a computer readable storage medium associated with a computing device;
   program instructions to receive a selection of particular computing resources of a cloud computing provider of the computing device used to run computing tasks on the computing device, the selection of particular computing resources of the cloud computing provider being received as a service request;
   program instructions to execute the computing tasks on the particular computing resources;
   program instructions to estimate an amount of time and estimate an amount of power used for executing the computing tasks on the particular computing resources of the computing device;
   program instructions to determine a number of standard energy units consumed by the computing tasks based on the estimated amount of time and the estimated amount of power;
   program instructions to determine a financial cost for use of the particular computing resources based on the determined number of standard energy units consumed by the computing tasks;
   program instructions to bill a fee for using the particular computing resources based on the determined financial cost for the number of standard energy units consumed by the computing device;
   program instructions to determine that the particular cloud computing resources are overloaded on the cloud computing provider;
   program instructions to receive a request to change the particular cloud computing resources to be used in the executing of the computing tasks in response to the determining that the particular cloud computing resources are overloaded on the cloud computing provider;
   program instructions to reallocate the number of standard energy units to different cloud computing resources based on the received request;
   program instructions to receive collected data from a first edge computing device;
   program instructions to determine a number of standard energy units consumed by the first edge computing device in receiving the collected data from a second edge computing device; and
   program instructions to bill an owner of the second edge computing device which is different from the first edge computing device,
   wherein the program instructions are stored on the computer readable storage medium for execution by the hardware processor via the computer readable memory.

18. The system according to claim 17, further comprising program instructions to determine a number of seconds used in the executing the computing tasks as the amount of time, wherein the first edge computing device comprises an Internet of things (IoT) device.

19. The system according to claim 18, further comprising program instructions to determine a number of watts used in the executing the computing tasks as the amount of power, wherein the first edge computing device receives the collected data from the second edge computing device through Bluetooth.

20. The system according to claim 17, further comprising program instructions to determine a number of joules used in the executing the computing tasks as the number of standard energy units by multiplying the determined number of seconds and the determined number of watts.

* * * * *